United States Defensive Publication [19] (H) [11] T957,003
Freshour [43] Apr. 5, 1977

[54] METHOD OF CLEANING PVC REACTORS

[75] Inventor: Kenneth D. Freshour, Ponca City, Okla.

[73] Assignee: Continental Oil Company, Ponca City, Okla.

[21] Appl. No.: 704,140

[22] Filed: July 12, 1976

[51] Int. Cl.$^2$ ..... B08B 7/00
[52] U.S. Cl. ..... 134/4; 134/22 R; 134/38

[57] ABSTRACT

Surfaces of polyvinylchloride reactors are cleaned using a solvent gel composition. The solvent gel composition comprises: (a) solvent, (b) gelling agent, and (c), in some cases, a neutralizing agent. Suitable solvents include N-methyl-2-pyrrolidone, N-ethyl-2-pyrrolidone, and N-propyl-2-pyrrolidone. Suitable gelling agents include carboxy polymethylene polymer and hydroxyethyl cellulose. A suitable neutralizing agent is di-2-ethylhexylamine. The composition is applied to the reactor surfaces by conventional means, such as a brush. The composition is left on the reactor surface for at least one-half hour. It is then removed from the reactor surface for at least one-half hour. It is then removed from the reactor surface using a scraper (preferably non-metallic). If necessary, the entire process may be repeated to completely remove the deposits. In some cases it may be desirable to then apply the solvent per se in order to remove any film or polymer which may remain.

5 Claims, No Sheets Drawing,

9 Pages Specification

The file of this unexamined application may be inspected and copies thereof may be purchased (849 O.G. 1221, Apr. 9, 1968).